US012735345B2

(12) United States Patent
Hofmann et al.

(10) Patent No.: US 12,735,345 B2
(45) Date of Patent: Sep. 15, 2026

(54) GLASS COMPOSITION FOR PRODUCING HIGH STRENGTH AND HIGH MODULUS FIBERS

(75) Inventors: Douglas Alan Hofmann, Hebron, OH (US); Peter Bernard McGinnis, Gahanna, OH (US)

(73) Assignee: Owens Corning Intellectual Capital, LLC, Toledo, OH (US)

( * ) Notice: Subject to any disclaimer, the term of this patent is extended or adjusted under 35 U.S.C. 154(b) by 0 days.

(21) Appl. No.: 13/879,631

(22) PCT Filed: Oct. 18, 2011

(86) PCT No.: PCT/IB2011/002628

§ 371 (c)(1), (2), (4) Date: May 13, 2013

(87) PCT Pub. No.: WO2012/052840

PCT Pub. Date: Apr. 26, 2012

(65) Prior Publication Data

US 2013/0225025 A1 Aug. 29, 2013

Related U.S. Application Data

(60) Provisional application No. 61/394,177, filed on Oct. 18, 2010.

(51) Int. Cl.

| | |
|---|---|
| ***C03C 3/087*** | (2006.01) |
| ***C03B 37/02*** | (2006.01) |
| ***C03C 13/00*** | (2006.01) |
| ***C08J 5/08*** | (2006.01) |

(52) U.S. Cl.

CPC .............. *C03C 3/087* (2013.01); *C03B 37/02* (2013.01); *C03C 13/00* (2013.01); *C08J 5/08* (2013.01); *C08J 2300/22* (2013.01); *C08J 2300/24* (2013.01); *Y10T 442/2992* (2015.04)

(58) Field of Classification Search

CPC ......... C03C 3/076; C03C 3/083; C03C 3/058; C03C 3/087

USPC .......................... 501/35, 36, 70; 65/454, 459

See application file for complete search history.

(56) References Cited

U.S. PATENT DOCUMENTS

| | | | |
|---|---|---|---|
| 6,284,357 | B1 * | 9/2001 | Lackey .................. C04B 35/52 427/249.1 |
| 8,338,319 | B2 | 12/2012 | McGinnis |
| 9,206,068 | B2 | 12/2015 | McGinnis |
| 2004/0092379 | A1 | 5/2004 | Lewis |
| 2006/0001005 | A1 * | 1/2006 | Kishimoto ............. C03C 3/085 252/301.33 |
| 2008/0009403 | A1 | 1/2008 | Hofmann |
| 2008/0020919 | A1 | 1/2008 | Murata |
| 2010/0162772 | A1 * | 7/2010 | McGinnis et al. ............. 65/474 |
| 2013/0122767 | A1 | 5/2013 | Hofmann |
| 2013/0210962 | A1 | 8/2013 | Hofmann |
| 2013/0225025 | A1 | 8/2013 | McGinnis |
| 2015/0315067 | A1 | 11/2015 | McGinnis |

FOREIGN PATENT DOCUMENTS

| | | |
|---|---|---|
| GB | 1023489 | 3/1966 |
| JP | 2003137590 A * | 5/2003 |
| WO | 07/055968 | 5/2007 |
| WO | 12/001654 | 1/2012 |
| WO | 2012/052840 | 4/2012 |
| WO | 2012/052841 | 4/2012 |

OTHER PUBLICATIONS

Machine translation of JP-2003137590 A,May 2003.*

Office action from Chinese Application No. 201180056844.2 dated Dec. 3, 2014.

International Search Report and Written Opinion from PCT/IB2011/002628 dated May 22, 2012.

International Search Report and Written Opinion from PCT/IB2011/002700 dated Mar. 5, 2012.

Fisher, J.R., "Glass Fiber Drawing and Measuring Facilities at the U.S. Naval Ordinance Laboratory", Chemistry Research Dept., U.S. Naval Ordnance Laboratory, 54 pgs., Published Aug. 1965.

Office action from Chinese Application No. 201180056847.6 dated Dec. 29, 2014.

Office action from Chinese Application No. 201180056844.2 dated Jul. 22, 2015.

Office action from Chinese Application No. 201180056847.6 dated Aug. 14, 2015.

Office action from Chinese Application No. 201180056844.2 dated Jun. 27, 2016.

Office action from U.S. Appl. No. 13/879,630 dated Dec. 22, 2015.

Office action from Chinese Application No. 201180056847.6 dated Feb. 16, 2016.

Qiuhong et al., "Application of Liquid Buoyancy Method in Glass Fiber Density Test", pp. 54-55, Fiber Inspection No. 3, 2008.

Office action from Chinese Application No. 201180056844.2 dated Jan. 13, 2016.

Communication from European Application No. 11802136.9 dated Apr. 8, 2016.

(Continued)

*Primary Examiner* — Peter Y Choi

(74) *Attorney, Agent, or Firm* — Bryan D. Zerhusen; Nicholas R. Herrel; CANTOR COLBURN LLP

(57) ABSTRACT

A glass composition including $SiO_2$ in an amount from about 70.6 to about 79.6% by weight, $Al_2O_3$ in an amount from about 10.0 to 18.5% by weight, MgO in an amount from about 10.0 to about 19.0% by weight, CaO in an amount from about 0.1 to about 5.0% by weight, $Li_2O$ in an amount from 0.0 to about 3.0% by weight, and $Na_2O$ in an amount from 0.0 to about 3.0% by weight is provided. In exemplary embodiments, the glass composition is free or substantially free of $B_2O_3$ and fluorine. The glass fibers have a specific modulus between about $3.4\times10^7$ J/kg and $3.6\times10^7$ J/kg. Glass fibers formed from the inventive composition possess an exceptionally high modulus and a low density, which make them particularly suitable in applications that require high strength, high stiffness, and low weight, such as wind blades and aerospace structures.

18 Claims, No Drawings

(56) References Cited

OTHER PUBLICATIONS

Office action from U.S. Appl. No. 13/879,630 dated May 31, 2016.
Office action from U.S. Appl. No. 13/879,630 dated Jan. 10, 2017.
Office action from Chinese Application No. 201180056844.2 dated Dec. 12, 2016.
Office action from U.S. Appl. No. 13/879,630 dated Sep. 28, 2016.
Office action from Chinese Application No. 201180056847.6 dated Jul. 27, 2016.
Office action from U.S. Appl. No. 13/879,630 dated May 26, 2017.
Notice of Allowance from U.S. Serial No. 13/879, 630 dated Sep. 15, 2017.
Notification of Reexamination in Chinese Application No. 201180056847.6 dated Aug. 2, 2018.
Translation of Office action from Chinese Application No. 201180056847.6 dated Feb. 22, 2017.
Communication pursuant to Article 94(3) EPC from EP Application No. 11802136.9 dated Nov. 20, 2018.

* cited by examiner

GLASS COMPOSITION FOR PRODUCING HIGH STRENGTH AND HIGH MODULUS FIBERS

CROSS REFERENCE TO RELATED APPLICATION

This application is the U.S. national phase entry of PCT/IB2011/02628 with an international filing date of Oct. 18, 2011 which claims priority and all other benefits of U.S. Provisional Application Ser. No. 61/394,177 both of which are hereby incorporated by reference in their entirety.

TECHNICAL FIELD AND INDUSTRIAL APPLICABILITY

The present invention relates generally to a glass composition, and more particularly, to a high performance glass composition that possesses acceptable forming properties and whose components are melted in a refractory melter. Glass fibers formed from the inventive composition possess an improved modulus and a low density and may be used to reinforce composite matrices where high strength, stiffness, and light weight are desired.

BACKGROUND OF THE INVENTION

Glass fibers are manufactured from various raw materials combined in specific proportions to yield a desired chemical composition. This collection of materials is commonly termed a "glass batch." To form glass fibers, typically the glass batch is melted in a melter or melting apparatus, the molten glass is drawn into filaments through a bushing or orifice plate (the resultant filaments are also referred to as continuous glass fibers), and a sizing composition containing lubricants, coupling agents and film-forming binder resins is applied to the filaments. After the sizing is applied, the fibers may be gathered into one or more strands and wound into a package or, alternatively, the fibers may be chopped while wet and collected. The collected chopped strands may then be dried and cured to form dry chopped fibers or they can be packaged in their wet condition as wet chopped fibers.

The composition of the glass batch and the glass manufactured from it are typically expressed in terms of percentages of the components, which are mainly expressed as oxides. $SiO_2$, $Al_2O_3$, CaO, MgO, $B_2O_3$, $Na_2O$, $K_2O$, $Fe_2O_3$, and minor amounts of other compounds such as $TiO_2$, $Li_2O$, BaO, SrO, ZnO, $ZrO_2$, $P_2O_5$, fluorine, and $SO_3$ are common components of a glass batch. Numerous types of glasses may be produced from varying the amounts of these oxides, or eliminating some of the oxides in the glass batch. Examples of such glasses that may be produced include R-glass, E-glass, S-glass, A-glass, C-glass, and ECR-glass. The glass composition controls the forming and product properties of the glass. Other characteristics of glass compositions include the raw material cost and environmental impact.

There is a unique combination of forming properties that permit a glass to be melted and distributed in a conventional refractory tank and glass distribution system. First, the temperature at which the glass is held must be low enough so that it does not aggressively attack the refractory. An attack on a refractory can take place, for example, by exceeding the maximum use temperature of the refractory or by increasing the rate at which the glass corrodes and erodes the refractory to an unacceptably high level. Refractory corrosion rate is strongly increased as the glass becomes more fluid by a decrease in the glass viscosity. Therefore, in order for a glass to be melted in a refractory tank, the temperature of the refractory must be kept below a certain temperature and the glass viscosity (e.g., resistance to flow) must be maintained above a certain value. Also, the temperature of the glass in the melting unit, as well as throughout the entire distribution and fiberizing process, must be high enough to prevent crystallization of the glass (i.e., it must be kept at a temperature above the liquidus temperature).

At the fiberizer, it is common to require a minimum temperature differential between the temperature selected for fiberizing (i.e., forming temperature) and the liquidus temperature of the glass. This temperature differential, $\Delta T$, is a measurement of how easily continuous fibers can be formed without production of the fibers being interrupted by breaks caused from devitrification crystals. Accordingly, it is desirable to have as large a $\Delta T$ as possible to achieve continuous and uninterrupted glass fiber formation.

In the quest for glass fibers having a higher end performance, $\Delta T$ has, at times, been sacrificed to achieve desired end properties. The consequence of this sacrifice is a requirement that the glass be melted in a platinum or platinum-alloy lined furnace, either because the temperature exceeded the maximum end use temperature of the conventional refractory materials or because the viscosity of the glass was such that the temperature of the glass body could not be held above the liquidus temperature while producing a glass viscosity high enough to keep the refractory corrosion at an acceptable level. S2-glass is one example where both of these phenomena take place. The melting temperature of S2-glass is too high for common refractory materials and the $\Delta T$ is very small (or negative), thus causing the glass to be very fluid and very corrosive to conventional refractories at glass temperatures above the liquidus temperature. Conventional R-glass also has a very small $\Delta T$, and is therefore melted in platinum or platinum-alloy lined melters.

Thus, there is a need in the art for high-performance glass compositions that retain favorable mechanical and physical properties (e.g., specific modulus and tensile strength) and forming properties (e.g., liquidus temperature and forming temperature) where the forming temperature is sufficiently low and the difference between the forming and liquidus temperatures is large enough to enable the components of the glass composition to be melted in a conventional refractory tank.

SUMMARY OF THE INVENTION

In one embodiment of the invention, a composition that includes $SiO_2$ in an amount from about 70.6 to about 79.6% by weight, $Al_2O_3$ in an amount from about 10.0 to 18.5% by weight, MgO in an amount from about 10.0 to about 19.0% by weight, CaO in an amount from about 0.1 to about 5.0% by weight, $Li_2O$ in an amount from 0.0 to about 3.0% by weight, and $Na_2O$ in an amount from 0.0 to about 3.0% by weight is provided. The phrase "% by weight", as used herein, is intended to be defined as the percent by weight of the total composition. In exemplary embodiments, the glass composition is free or substantially free of $B_2O_3$ and fluorine, although either can be added in small amounts to adjust the fiberizing and finished glass properties and will not adversely impact the properties if maintained below several percent. As used herein, substantially free of $B_2O_3$ and fluorine means that the sum of the amounts of $B_2O_3$ and fluorine present is less than 1% by weight of the composition. The sum of the amounts of $B_2O_3$ and fluorine present can be less than 0.5% by weight of the composition or less than 0.2% by weight of the composition. Additionally, the composition may optionally contain trace quantities of other components or impurities that are not intentionally added. Further, the glass composition possesses a forming temperature (also referred to herein as the forming viscosity, the fiberizing temperature or the log 3 temperature) that is low enough to utilize low cost refractory melters instead of conventional high cost platinum-alloy lined melters in the formation of the glass fibers.

In another embodiment of the present invention, a continuous glass fiber formed of the composition described above is produced using a refractory tank melter. By utilizing a refractory tank formed of refractory blocks, manufacturing costs associated with the production of glass fibers produced by the inventive composition may be reduced. The glass compositions may be used to form continuous glass strands for use in applications where high strength, stiffness, and low density are required.

In yet another embodiment of the present invention, a reinforced composite formed of a product a matrix material and a plurality of fibers formed with the composition described above is provided. The matrix material may be a polymer and may be any suitable thermoplastic or thermoset resin known to those of skill in the art, and include thermoplastics such as polyesters, polypropylene, polyamide, polyethylene terephthalate, and polybutylene, and thermoset resins such as epoxy resins, unsaturated polyesters, phenolics, vinylesters, and elastomers. The polymer resins can be used alone or in combination to form the final composite product.

In yet another embodiment of the present invention, a method of forming a high performance glass fiber is provided. The fibers may be formed by obtaining the raw ingredients and mixing the components in the appropriate quantities to give the desired weight percentages of the final composition. The mixed batch is then melted in a traditional refractory melter and drawn through orifices of platinum-alloy based bushings to form glass fibers. Strands of glass fibers are formed by gathering the individual filaments together. The strands may be wound and further processed in a conventional manner suitable for the intended application. The glass fibers of the invention are obtainable by any of the methods described herein.

In another embodiment of the present invention, the inventive composition has a liquidus temperature no greater than about 1470 or 1420° C., a log 3 temperature less than about 1530° C. and a $\Delta T$ up to about 210° C.

In another embodiment of the present invention, the inventive composition has a liquidus temperature no greater than about 1470° C., a log 3 temperature less than about 1525° C. and a $\Delta T$ up to about 139° C.

In yet another embodiment of the invention, glass fibers formed from the inventive composition have a pristine fiber tensile strength between about 4150 and about 4960 or 5233 MPa, a modulus between about 80 to about 88 GPa, and a density between about 2.37 to about 2.51 g/cc.

In yet another embodiment of the invention, glass fibers formed from the inventive composition have a pristine fiber tensile strength from about 4590 to about 5230 or 5232 MPa, a modulus from about 82.8 to about 87.4 GPa, and a density from about 2.39 to about 2.48 g/cc.

In a further embodiment of the invention, glass fibers formed from the inventive composition have a specific modulus between about $3.4\times10^7$ J/kg and about $3.6\times10^7$ J/kg and a specific strength between about $1.7\times10^6$ J/kg and about 2.0 or $2.14\times10^6$ J/kg.

In a further embodiment of the invention, glass fibers formed from the inventive composition have a specific modulus from about $3.4\times10^7$ J/kg to about 3.56 or $3.6\times10^7$ J/kg and a specific strength from about $1.9\times10^6$ J/kg to about $2.1\times10^6$ J/kg.

In a further embodiment of the invention, glass fibers formed from the inventive composition have a specific modulus from about $3.40\times10^7$ J/kg to about $3.56\times10^7$ J/kg and a specific strength from about $1.85\times10^6$ J/kg to about $2.14\times10^6$ J/kg.

In another embodiment of the present invention, the glass composition possesses a forming viscosity that is low enough, and a $\Delta T$ that is large enough, to utilize low cost refractory melters instead of conventional high cost platinum-alloy lined melters in the formation of the glass fibers.

In another embodiment of the present invention, fibers formed from the inventive composition are formed at a lower cost due to the lower energy input needed to melt the glass composition.

The foregoing and other objects, features, and advantages of the invention will appear more fully hereinafter from a consideration of the detailed description that follows.

DETAILED DESCRIPTION AND PREFERRED EMBODIMENTS

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are described herein. All references cited herein, including published or corresponding U.S. or foreign patent applications, issued U.S. or foreign patents, and any other references, are each incorporated by reference in their entireties, including all data, tables, figures, and text presented in the cited references. The terms "composition" and "formulation" may be used interchangeably herein. Additionally, the phrase "inventive glass composition" and "glass composition" may be interchangeably used.

The present invention relates to a glass composition used to form continuous glass fibers that possess an exceptional modulus and a low density. The glass composition possesses a low forming temperature and a sufficiently large $\Delta T$ to permit the utilization of low-cost refractory tank melters for the formation of the glass fibers instead of conventional high-cost paramelters formed of platinum. By utilizing a refractory tank formed of refractory blocks, manufacturing costs associated with the production of glass fibers produced by the inventive composition are reduced. Additionally, the energy necessary to melt the components of the glass composition is less than the energy necessary to melt many commercially available glass formulations. Such lower energy requirements may also lower the overall manufacturing costs associated with the inventive glass. Further, the composition of the present invention retains the ability to make a commercially acceptable high performance glass fiber and fiber product produced from the glass fibers. In particular, glass fibers formed using the inventive composition may be used to form composite products that are both light weight and exceptionally strong.

The inventive glass composition includes the following components in the weight percent ranges given in Table 1. As used herein, the terms "weight percent" and "percent by weight" may be used interchangeably and are meant to denote the weight percent (or percent by weight) based on the total composition.

TABLE 1

| Chemical | %by weight |
|---|---|
| $SiO_2$ | 70.6-79.6 |
| $Al_2O_3$ | 10.0-18.5 |
| MgO | 10.0-19.0 |
| CaO | 0.1-5.0 |
| $Li_2O$ | 0.0-3.0 |
| $Na_2O$ | 0.0-3.0 |

In one embodiment of the invention, the glass composition can comprise $SiO_2$ in an amount of from about 70.6 to about 73.55% by weight, $Al_2O_3$ in an amount of from about 10.68 to 18.5% by weight, MgO in an amount of from 10.0 to 15.62% by weight, CaO in an amount of from 0.1 to 1.70% by weight, $Li_2O$ in an amount of from 0.08 to 3.0% by weight and $Na_2O$ in an amount of from 0.0 to 3.0% by weight and thus includes the components set forth in Table 2.

TABLE 2

| Chemical | % by weight |
|---|---|
| $SiO_2$ | 70.6-73.55 |
| $Al_2O_3$ | 10.68-18.5 |
| MgO | 10.0-15.62 |
| CaO | 0.1-1.7 |
| $Li_2O$ | 0.08-3.0 |
| $Na_2O$ | 0.0-3.0 |

In one embodiment of the invention, the glass composition comprises $SiO_2$ in an amount of from about 70.6 to about 73.0% by weight, $Al_2O_3$ in an amount of from about 16.0 to 18.5% by weight, MgO in an amount of from 10.0 to 13.0% by weight, CaO in an amount of 0.1 to 2.0% by weight, $Li_2O$ in an amount of 0.0 to 2.0% by weight and $Na_2O$ in an amount of 0.0 to 2.0% by weight and thus includes the components set forth in Table 3.

TABLE 3

| Chemical | % by weight |
|---|---|
| $SiO_2$ | 70.6-73.0 |
| $Al_2O_3$ | 16.0-18.5 |
| MgO | 10.0-13.0 |
| CaO | 0.1-2.0 |
| $Li_2O$ | 0.0-2.0 |
| $Na_2O$ | 0.0-2.0 |

In one embodiment of the invention, the glass composition comprises $SiO_2$ in an amount of from about 70.85 to about 77.56% by weight, $Al_2O_3$ in an amount of from about 10.0 to 18.5% by weight, MgO in an amount of from 10.0 to 12.58% by weight, CaO in an amount of 0.1 to 1.7% by weight, $Li_2O$ in an amount of 0.0 to 2.34% by weight and $Na_2O$ in an amount of 0.0 to 0.98% by weight and thus includes the components set forth in Table 4.

TABLE 4

| Chemical | % by weight |
|---|---|
| $SiO_2$ | 70.85-77.56 |
| $Al_2O_3$ | 10.0-18.5 |
| MgO | 10.0-12.58 |
| CaO | 0.1-1.7 |
| $Li_2O$ | 0.0-2.34 |
| $Na_2O$ | 0.0-0.98 |

In one embodiment of the invention, the glass composition comprises $SiO_2$ in an amount of from about 70.60 to about 77.56% by weight, $Al_2O_3$ in an amount of from about 10.0 to 18.5% by weight, MgO in an amount of from 10.0 to 12.95% by weight, CaO in an amount of 0.1 to 1.7% by weight, $Li_2O$ in an amount of 0.08 to 3.0% by weight and $Na_2O$ in an amount of 0.0 to 0.98% by weight and thus includes the components set forth in Table 5.

TABLE 5

| Chemical | % by weight |
|---|---|
| $SiO_2$ | 70.60-77.56 |
| $Al_2O_3$ | 10.0-18.5 |
| MgO | 10.0-12.95 |
| CaO | 0.1-1.7 |
| $Li_2O$ | 0.08-3.0 |
| $Na_2O$ | 0.0-0.98 |

Further, impurities or tramp materials may be present in the glass composition without adversely affecting the glasses or the fibers. These impurities may enter the glass as raw material impurities or may be products formed by the chemical reaction of the molten glass with furnace components. Non-limiting examples of tramp materials include potassium, iron, zinc, strontium, and barium, all of which are present in their oxide forms, and fluorine and chlorine. The glass composition can be free or substantially free of $B_2O_3$ and fluorine.

The glass compositions described herein can contain $B_2O_3$ and fluorine in a combined amount of less than 1% by weight of the composition. Further the glass compositions described herein can contain less than 1% by weight of each of $K_2O$, $Fe_2O_3$, $TiO_2$, BaO, SrO, ZnO, $ZrO_2$, $P_2O_5$, and $SO_3$. The sum of the components of glass compositions described herein, of course, totals to 100% by weight.

The invention also relates to glass fibers formed form the glass compositions disclosed herein. Pristine glass fibers (i.e., unsized and untouched laboratory produced fibers) have a fiber tensile strength from about 4150 to about 4960 or 5232 MPa. Additionally, the pristine fibers have a modulus from about 80 to about 88 GPa or between about 83 and about 87 GPa, and a density from about 2.37 to about 2.51 g/cc.

In another embodiment, the pristine glass fibers have a fiber tensile strength from about 4590 to about 4960 or 5232 MPa. Additionally, the pristine fibers have a modulus from about 82.8 to about 87.4 GPa or between about 83 and about 87 GPa, and a density from about 2.38 or 2.39 to about 2.48 g/cc.

The fiber tensile strength is also referred herein as "strength" and is measured on pristine fibers using an Instron tensile testing apparatus according to ASTM D2343-09. As referred to herein, the modulus is an average of measurements on 5 single glass fibers measured in accordance with the procedure outlined in the report "Glass Fiber and Measuring Facilities at the U.S. Naval Ordnance Laboratory", Report Number NOLTR 65-87, Jun. 23, 1965. The density is measured by the Archimedes method (ASTM C693-93 (2008)) on unannealed bulk glass.

Fiberizing properties of the glass composition of the present invention include the fiberizing temperature, the liquidus temperature, and ΔT. The fiberizing temperature is defined as the temperature that corresponds to a viscosity of about 1000 Poise and, as used herein, is measured using a rotating cylinder method (ASTM C965-96 (2007)). The fiberizing temperature can also be referred to as the log 3 temperature or the forming viscosity. Lowering the fiberizing temperature may reduce the production cost of the glass fibers because it allows for a longer bushing life and reduced energy usage. For example, at a lower fiberizing temperature, a bushing operates at a cooler temperature and does not quickly "sag". Sag is a phenomenon that occurs in bushings that are held at an elevated temperature for extended periods of time. Thus, by lowering the fiberizing temperature, the sag rate of the bushing may be reduced and the bushing life can be increased.

In addition, a lower fiberizing temperature allows for a higher throughput since more glass can be melted in a given period at a given energy input. Additionally, a lower fiberizing temperature will permit glass formed with the inventive composition to be melted in a refractory-lined melter instead of conventional high-cost paramelters formed of platinum since both its melting and fiberizing temperatures are below the upper use temperatures of many commercially available refractories. The inventive glass composition has a fiberizing temperature (i.e., log 3 temperature) that is less than about 1525° C. or 1530° C. In exemplary embodiments, the log 3 temperature is from about 1268° C. to about 1525° C. or from about 1300 or 1310° C. to about 1530° C.

The liquidus temperature is defined as the highest temperature at which equilibrium exists between liquid glass and its primary crystalline phase. As used herein, the liquidus temperature is measured by exposing the glass composition to a temperature gradient in a platinum-alloy boat for 16 hours (ASTM C829-81 (2005)).

At all temperatures above the liquidus temperature, the glass is free from crystals in its primary phase. At temperatures below the liquidus temperature, crystals may form. Additionally, the liquidus temperature is the greatest temperature at which devitrification can occur upon cooling the glass melt. At all temperatures above the liquidus temperature, the glass is completely molten. The liquidus temperature of the inventive composition is desirably no greater than about 1469° C. or 1470° C., and may range from about 1299° C. to about 1469° C. or from about 1300° C. to about 1470° C. In one embodiment, the liquidus temperature of the inventive composition is desirably no greater than about 1420° C., and may range from about 1200° C. to about 1420° C.

A third fiberizing property is "ΔT", which is defined as the difference between the fiberizing temperature (i.e., log 3 temperature) and the liquidus temperature. If the ΔT is too small, the molten glass may crystallize within the fiberizing apparatus and cause a break in the manufacturing process. Desirably, the ΔT is as large as possible for a given forming viscosity. A larger ΔT offers a greater degree of flexibility during fiberizing and helps to avoid devitrification both in the glass distribution system and in the fiberizing apparatus. Additionally, a large ΔT reduces the production cost of the glass fibers by allowing for a greater bushing life and a less sensitive forming process. The inventive composition may have a ΔT up to about 139° C., 140° C. or 210° C., and in exemplary embodiments, from about −54° C. to about 139° C. or 140° C. and from about 70° C. to about 210° C. In one embodiment, ΔT is greater than 60° C.

Another property of importance is the specific modulus. Is it desirable to have a specific modulus as high as possible to achieve a lightweight composite material that adds stiffness to the final article. Specific modulus is important in applications where stiffness of the product is an important parameter, such as in wind energy and aerospace applications. As used herein, the specific modulus is calculated by the following equation: Specific Modulus (MJ/kg)=Modulus (GPa)/Density (kg/cubic meter). In the inventive composition, the glass has a specific modulus from about $3.40\times10^7$ J/kg to about $3.56\times10^7$ J/kg or $3.6\times10^7$ J/kg. In one embodiment, the glass fibers have a specific modulus greater than or equal to $3.5\times10^7$ J/kg. In addition, the glass fibers have a specific strength from about 1.7 or $1.85\times10^6$ J/kg to about 2.0, 2.1 or $2.14\times10^6$ J/kg. In one embodiment, the glass fibers have a specific strength greater than or equal to $2.0\times10^6$ J/kg. As used herein the specific strength is calculated by the following equation: Specific Strength (MJ/kg) =Strength (MPa)/Density (kg/cubic meter).

In general, glass fibers according to the present invention may be formed by obtaining the raw materials or ingredients and mixing or blending the components in a conventional manner in the appropriate quantities to give the desired weight percentages of the final composition. For example, the components may be obtained from suitable ingredients or raw materials including, but not limited to, sand or pyrophyllite for $SiO_2$, limestone, burnt lime, wollastonite, or dolomite for CaO, kaolin, alumina or pyrophyllite for $Al_2O_3$, dolomite, dolomitic quicklime, brucite, enstatite, talc, burnt magnesite, or magnesite for MgO, lithium carbonate or spodumene for $Li_2O$ and sodium carbonate, sodium feldspar or sodium sulfate for the $Na_2O$. Glass cullet can also be used to supply one or more of the needed oxides. The mixed batch is then melted in a traditional refractory furnace or melter, and the resulting molten glass is passed along a forehearth and into bushings (e.g., platinum-alloy based bushings) located along the bottom of the forehearth. The operating temperatures of the glass in the furnace, forehearth, and bushing are selected to appropriately adjust the viscosity of the glass, and may be maintained using suitable methods such as control devices. Preferably, the temperature at the front end of the melter is automatically controlled to reduce or eliminate devitrification. The molten glass is then pulled (drawn) through holes or orifices in the bottom or tip plate of the bushing to form glass fibers. The streams of molten glass flowing through the bushing orifices are attenuated to filaments by winding a strand formed of a plurality of individual filaments on a forming tube mounted on a rotatable collet of a winding machine or chopped at an adaptive speed.

The fibers may be further processed in a conventional manner suitable for the intended application. For instance, the glass fibers may be sized with a sizing composition known to those of skill in the art. The sizing composition is in no way restricted, and may be any sizing composition suitable for application to glass fibers. The sized fibers may be used for reinforcing substrates such as a variety of plastics where the product's end use requires high strength and stiffness and low weight. Such applications include, but are not limited to, woven fabrics for use in forming wind blades, armor plating, and aerospace structures. In this regard, the present invention also includes a composite material including the inventive glass fibers, as described above, in combination with a hardenable matrix material. The matrix material may be any suitable thermoplastic or thermoset resin known to those of skill in the art, such as, but not limited to thermoplastics such as polyesters, polypropylene, polyamide, polyethylene terephthalate, and polybutylene, and thermoset resins such as epoxy resins, unsaturated polyesters, phenolics, vinylesters, and elastomers. These resins can be used alone or in combination.

Having generally described this invention, a further understanding can be obtained by reference to certain specific examples illustrated below which are provided for purposes of illustration only and are not intended to be all inclusive or limiting unless otherwise specified.

EXAMPLES

Example 1

High Performance Glass Compositions

Glass compositions according to the present invention are made by mixing reagent grade chemicals in proportioned amounts to achieve a final glass composition with the oxide weight percentages set forth in Tables 6 and 7. The raw materials are incited in a platinum crucible in an electrically heated furnace at a temperature of 1650° C. for 3 hours. The forming viscosity (i.e., the temperature that corresponds to a viscosity of about 1000 Poise) was measured using a rotating cylinder method (ASTM C965-96 (2007)). The liquidus temperature was measured by exposing glass to a temperature gradient in a platinum-alloy boat for 16 hours (ASTM C829-81 (2005)). Density was measured by the Archimedes method (ASTM C693-93 (2008)). To make glass fibers for testing modulus and strength, cullet from a glass composition was added to an electrically resistance bushing and pulled from a single tip at the bottom of the bushing. The fibers were wound onto a rotating drum, but samples for testing were collected from the fiber between the tip of the bushing and the winder. These lengths of fiber, approximately 2 meters in length are placed on forks or sample boards where the length to be tested does not come in contact with anything but the ambient atmosphere. The fibers are then mounted and tested using the appropriate equipment. The modulus is measured indirectly by measuring the speed of sound in a fiber with known density. Specifically, the modulus reported in the tables below is an average of measurements on 5 single glass fibers measured in accordance with the procedure outlined in the report "Glass Fiber and Measuring Facilities at the U.S. Naval Ordnance Laboratory", Report Number NOLTR 65-87, Jun. 23, 1965. The strength was measured on pristine fibers using an Instron tensile testing apparatus according to ASTM D2343-09. The specific modulus was calculated by dividing the measured modulus in units of GPa by the density in units of $kg/m^3$. The specific strength was calculated by dividing the measured strength in units of MPa by the density in units of $kg/m^3$.

TABLE 6

| Chemical | Ex. 1 (% by wt.) | Ex. 2 (% by wt) | Ex. 3 (% by wt.) | Ex. 4 (% by wt.) | Ex. 5 (% by wt.) | Ex. 6 (% by wt.) | Ex. 7 (% by wt.) |
|---|---|---|---|---|---|---|---|
| $SiO_2$ | 72.84 | 70.60 | 73.50 | 73.55 | 73.18 | 73.03 | 73.03 |
| $Al_2O_3$ | 12.11 | 12.78 | 10.00 | 12.78 | 12.43 | 12.30 | 12.30 |
| MgO | 12.24 | 12.95 | 12.90 | 10.00 | 12.58 | 12.43 | 12.43 |
| CaO | 1.32 | 1.70 | 1.68 | 1.70 | 0.10 | 1.42 | 1.42 |
| $Li_2O$ | 0.75 | 0.98 | 0.97 | 0.98 | 0.86 | 0.00 | 0.81 |
| $Na_2O$ | 0.75 | 0.98 | 0.97 | 0.98 | 0.86 | 0.81 | 0.00 |

TABLE 6-continued

| Chemical | Ex. 1 (% by wt.) | Ex. 2 (% by wt) | Ex. 3 (% by wt.) | Ex. 4 (% by wt.) | Ex. 5 (% by wt.) | Ex. 6 (% by wt.) | Ex. 7 (% by wt.) |
|---|---|---|---|---|---|---|---|
| Property | | | | | | | |
| Forming Viscosity (° C.) | 1468 | 1413 | 1442 | 1498 | 1335 | 1499 | 1472 |
| Liquidus Temperature (° C.) | 1406 | 1347 | 1397 | 1359 | 1393 | 1469 | 1456 |
| Density (g/cc) | 2.444 | 2.469 | 2.449 | 2.426 | 2.433 | 2.444 | 2.444 |
| Modulus (Gpa) | 85.4 | 86.4 | 84.8 | 83.8 | 85.3 | 84.2 | 84.9 |
| Strength (Mpa) | 4994 | 4870 | 4872 | 5032 | 5005 | 4896 | 5070 |
| Specific Modulus (X $10^7$ J/kg) | 3.49 | 3.50 | 3.46 | 3.46 | 3.51 | 3.45 | 3.47 |
| Specific Strength (X $10^6$ J/kg) | 2.04 | 1.97 | 1.99 | 2.07 | 2.06 | 2.00 | 2.07 |

TABLE 7

| Chemical | Ex. 8 (% by wt.) | Ex. 9 (% by wt.) | Ex. 10 (% by wt.) | Ex. 11 (% by wt) | Ex. 12 (% by wt.) | Ex. 13 (% by wt.) |
|---|---|---|---|---|---|---|
| $SiO_2$ | 77.56 | 70.85 | 70.60 | 71.82 | 72.25 | 72.25 |
| $Al_2O_3$ | 10.00 | 18.50 | 10.68 | 11.15 | 11.56 | 11.56 |
| MgO | 10.00 | 10.25 | 15.62 | 11.22 | 11.65 | 11.65 |
| CaO | 0.10 | 0.24 | 0.10 | 5.00 | 1.00 | 1.00 |
| $Li_2O$ | 2.34 | 0.08 | 3.00 | 0.41 | 3.00 | 0.55 |
| $Na_2O$ | 0.00 | 0.08 | 0.00 | 0.41 | 0.55 | 3.00 |
| Property | | | | | | |
| Forming Viscosity (° C.) | 1293 | 1525 | 1497 | 1427 | 1268 | 1448 |
| Liquidus Temperature (° C.) | 1299 | 1455 | 1408 | 1446 | 1323 | 1367 |
| Density (g/cc) | 2.385 | 2.441 | 2.472 | 2.475 | 2.480 | 2.438 |
| Modulus (Gpa) | 83.6 | 86.8 | 84.8 | 84.7 | 87.4 | 82.8 |
| Strength (Mpa) | 4847 | 5232 | 4647.1 | 4847 | 4590 | 4802 |
| Specific Modulus (X $10^7$ J/kg) | 3.51 | 3.56 | 3.43 | 3.42 | 3.52 | 3.40 |
| Specific Strength (X $10^6$ J/kg) | 2.03 | 2.14 | 1.88 | 1.96 | 1.85 | 1.97 |

Looking at Tables 6 and 7, it can be concluded that the glass compositions of Examples 1-13 have forming viscosity temperatures that are applicable for use in refractory furnaces. The specific modulus values for the glasses in some cases exceed commercial R-glass. In addition, it has been concluded that these glasses are particularly suited for applications that require both strength and stiffness to be equal to or greater than R-glass (e.g., wind blades). Further, the density of some of the glasses shown in Tables 6 and 7 is extremely low, which allows these glasses to be employed in aerospace applications.

The invention of this application has been described above both generically and with regard to specific embodiments. Although the invention has been set forth in what is believed to be the preferred embodiments, a wide variety of alternatives known to those of skill in the art can be selected within the generic disclosure. The invention is not otherwise limited, except for the recitation of the claims set forth below.

Having thus described the invention, what is claimed is:

1. A composition for preparing high strength glass fibers, the composition comprising the following components:

$SiO_2$ in an amount from 70.6 to 79.6% by weight of the total composition;

$Al_2O_3$ in an amount from 10.0 to 12.78% by weight of the total composition;

MgO in an amount from 10.0 to 19.0% by weight of the total composition;

CaO in an amount from 0.1 to 2.0% by weight of the total composition;

$Li_2O$ in an amount from 0.0 to 3.0% by weight of the total composition; and $Na_2O$ in an amount from 0.1 to 0.98% by weight of the total composition;

wherein the composition is free of $B_2O_3$;

wherein the composition comprises less than 1% by weight of each of $K_2O$, $Fe_2O_3$, $TiO_2$, BaO, SrO, ZnO, $ZrO_2$, $P_2O_5$, and $SO_3$;

wherein a sum of $SiO_2$, $Al_2O_3$, MgO, CaO, $Li_2O$, $Na_2O$, $K_2O$, $Fe_2O_3$, $TiO_2$, BaO, SrO, ZnO, $ZrO_2$, $P_2O_5$, and $SO_3$ totals 100% by weight of the composition;

wherein a temperature differential between the fiberizing temperature and a liquidus temperature of the composition is from 70° C. to 210° C.; and wherein the composition has a log 3 temperature of no more than 1,499° C.

2. The composition of claim 1, wherein $SiO_2$ is present in an amount from 70.6 to 73.55% by weight of the total composition;

$Al_2O_3$ is present in an amount from 10.68 to 12.78% by weight of the total composition;

MgO is present in an amount from 10.0 to 15.62% by weight of the total composition;

CaO is present in an amount from 0.1 to 1.7% by weight of the total composition;

$Li_2O$ is present in an amount from 0.08 to 3.0% by weight of the total composition; and $Na_2O$ is present in an amount from 0.0 to 3.0% by weight of the total composition.

3. The composition of claim 1, wherein $SiO_2$ is present in an amount from 70.6 to 73.0% by weight of the total composition;

$Al_2O_3$ is present in an amount from 10.0 to 12.78% by weight of the total composition;

MgO is present in an amount from 10.0 to 13.0% by weight of the total composition;

CaO is present in an amount from 0.1 to 2.0% by weight of the total composition;

$Li_2O$ is present in an amount from 0.0 to 2.0% by weight of the total composition; and $Na_2O$ is present in an amount from 0.0 to 2.0% by weight of the total composition.

4. The composition of claim 1, wherein $SiO_2$ is present in an amount from 70.85 to 77.56% by weight of the total composition;

$Al_2O_3$ is present in an amount from 10.0 to 12.78% by weight of the total composition;

MgO is present in an amount from 10.0 to 12.58% by weight of the total composition;

CaO is present in an amount from 0.1 to 1.7% by weight of the total composition;

$Li_2O$ is present in an amount from 0.0 to 2.34% by weight of the total composition; and $Na_2O$ is present in an amount from 0.0 to 0.98% by weight of the total composition.

5. The composition of claim 1, wherein $SiO_2$ is present in an amount from 70.6 to 77.56% by weight of the total composition;

$Al_2O_3$ is present in an amount from 10.0 to 12.78% by weight of the total composition;

MgO is present in an amount from 10.0 to 12.95% by weight of the total composition;

CaO is present in an amount from 0.1 to 1.7% by weight of the total composition;

$Li_2O$ is present in an amount from 0.08 to 3.0% by weight of the total composition; and $Na_2O$ is present in an amount from 0.0 to 0.98% by weight of the total composition.

6. The composition of claim 1, wherein the composition has a liquidus temperature no greater than 1,470° C.

7. The composition of claim 1, wherein components of the composition are melted in a refractory tank melter.

8. A high strength glass fiber produced from the composition of claim 1.

9. The glass fiber of claim 8, wherein the glass fiber has a specific modulus from $3.40\times10^7$ to $3.6\times10^7$ J/kg and a specific strength from $1.7\times10^6$ to $2.14\times10^6$ J/kg.

10. The glass fiber of claim 8, wherein the glass fiber has a specific modulus from $3.40\times10^7$ to $3.56\times10^7$ J/kg and a specific strength from $1.85\times10^6$ to $2.14\times10^6$ J/kg.

11. The glass fiber of claim 8, wherein the glass fiber has a pristine fiber tensile strength from 4,150 to 5,233 MPa, a modulus from 80 to 88 GPa, and a density from 2.37 to 2.51 g/cc.

12. The glass fiber of claim 8, wherein the glass fiber has a pristine fiber tensile strength from 4,590 to 5,230 MPa, a modulus from 82.8 to 87.4 GPa, and a density from 2.39 to 2.48 g/cc.

13. A reinforced composite product comprising:

a polymer matrix; and a plurality of glass fibers, the glass fibers being produced from a composition comprising the following components:

$SiO_2$ in an amount from 70.6 to 79.6% by weight of the total composition;

$Al_2O_3$ in an amount from 10.0 to 12.78% by weight of the total composition;

MgO in an amount from 10.0 to 19.0% by weight of the total composition;

CaO in an amount from 0.1 to 2.0% by weight of the total composition;

$Li_2O$ in an amount from 0.0 to 3.0% by weight of the total composition; and $Na_2O$ in an amount from 0.1 to 0.98% by weight of the total composition;

wherein the composition comprises less than 1% by weight of each of $K_2O$, $Fe_2O_3$, $TiO_2$, BaO, SrO, ZnO, $ZrO_2$, $P_2O_5$, and $SO_3$;

wherein a sum of $SiO_2$, $Al_2O_3$, MgO, CaO, $Li_2O$, $Na_2O$, $K_2O$, $Fe_2O_3$, $TiO_2$, BaO, SrO, ZnO, $ZrO_2$, $P_2O_5$, and $SO_3$ totals 100% by weight of the composition;

wherein a temperature differential between the fiberizing temperature and a liquidus temperature of the composition is from 70° C. to 210° C.; and wherein the composition has a log 3 temperature of no more than 1,499° C.

14. The composite product of claim 13, wherein the polymer matrix is a thermoplastic polymer selected from polyesters, polypropylene, polyamide, polyethylene terephthalate, polybutylene and combinations thereof.

15. The composite product of claim 13, wherein the polymer matrix is a thermoset polymer selected from epoxy resins, unsaturated polyesters, phenolics, vinylesters and combinations thereof.

16. The composite product of claim 13 in the form of a windblade.

17. The composition of claim 1, wherein the composition consists of the following components:

$SiO_2$ in an amount from 70.6 to 79.6% by weight of the total composition;

$Al_2O_3$ in an amount from 10.0 to 12.78% by weight of the total composition;

MgO in an amount from 10.0 to 19.0% by weight of the total composition;

CaO in an amount from 0.1 to 2.0% by weight of the total composition;

$Li_2O$ in an amount from 0.0 to 3.0% by weight of the total composition;

$Na_2O$ in an amount from 0.1 to 0.98% by weight of the total composition; and less than 1% by weight of each of $K_2O$, $Fe_2O_3$, $TiO_2$, BaO, SrO, ZnO, $ZrO_2$, $P_2O_5$, and $SO_3$.

18. The composite product of claim 13, wherein the glass fibers are produced from a composition consisting of the following components:

$SiO_2$ in an amount from 70.6 to 79.6% by weight of the total composition;

$Al_2O_3$ in an amount from 10.0 to 12.78% by weight of the total composition;

MgO in an amount from 10.0 to 19.0% by weight of the total composition;

CaO in an amount from 0.1 to 2.0% by weight of the total composition;

$Li_2O$ in an amount from 0.0 to 3.0% by weight of the total composition;

$Na_2O$ in an amount from 0.1 to 0.98% by weight of the total composition; and less than 1% by weight of each of $K_2O$, $Fe_2O_3$, $TiO_2$, BaO, SrO, ZnO, $ZrO_2$, $P_2O_5$, and $SO_3$.

* * * * *